United States Patent
Chae et al.

(10) Patent No.: US 11,984,628 B2
(45) Date of Patent: May 14, 2024

(54) METHOD OF PRODUCING ANTIOXIDANT WITH IMPROVED ANTIOXIDANT ABILITY AND DISPERSION PROPERTY FOR MEMBRANE-ELECTRODE ASSEMBLY

(71) Applicants: Hyundai Motor Company, Seoul (KR); Kia Corporation, Seoul (KR)

(72) Inventors: Il Seok Chae, Seoul (KR); Jong Kil Oh, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 109 days.

(21) Appl. No.: 17/845,153

(22) Filed: Jun. 21, 2022

(65) Prior Publication Data
US 2022/0416281 A1 Dec. 29, 2022

(30) Foreign Application Priority Data
Jun. 24, 2021 (KR) .................. 10-2021-0082026

(51) Int. Cl.
| | |
|---|---|
| H01M 8/1004 | (2016.01) |
| C09K 15/02 | (2006.01) |
| C09K 15/12 | (2006.01) |
| H01M 8/10 | (2016.01) |
| H01M 8/1039 | (2016.01) |
| H01M 8/1051 | (2016.01) |

(52) U.S. Cl.
CPC .......... *H01M 8/1004* (2013.01); *C09K 15/02* (2013.01); *C09K 15/12* (2013.01); *H01M 8/1039* (2013.01); *H01M 8/1051* (2013.01); *H01M 2008/1095* (2013.01); *H01M 2300/0082* (2013.01); *H01M 2300/0091* (2013.01)

(58) Field of Classification Search
CPC ............. H01M 8/1004; H01M 8/1039; H01M 8/1051; H01M 2008/1095; H01M 2300/0082; H01M 2300/0091; H01M 4/8663; H01M 8/1018; H01M 8/1023; H01M 8/1046; H01M 8/1048; H01M 8/1081; C09K 15/02; C09K 15/12; C09K 15/32; Y02E 60/50; Y02P 70/50
See application file for complete search history.

(56) References Cited

U.S. PATENT DOCUMENTS
2020/0212469 A1* 7/2020 Ko ..................... H01M 8/1004

OTHER PUBLICATIONS

Chen et al., "Reactivity of Hydroxyls and Water on a CeO2(111) Thin Film Surface: The Role of Oxygen Vacancy", J. Phys. Chem. C, 2013, 117, 5800.
Mullins et al., "Adsorption and Reaction of C1-C3 Alcohols over CeOX(111) Thin Films", J. Phys. Chem. C, 2010, 114, 17112.

* cited by examiner

*Primary Examiner* — Daniel S Gatewood
(74) *Attorney, Agent, or Firm* — Fox Rothschild LLP

(57) ABSTRACT

Disclosed is a method of producing an antioxidant that has excellent antioxidant ability and is well dispersed when applied to a membrane-electrode assembly (MEA). The method includes a step of preparing a powder including reduced metal oxide and a step of mixing the powder with a powdery ionomer to obtain an antioxidant in which the ionomer is bound to the surface of the reduced metal oxide.

14 Claims, 2 Drawing Sheets

METHOD OF PRODUCING ANTIOXIDANT WITH IMPROVED ANTIOXIDANT ABILITY AND DISPERSION PROPERTY FOR MEMBRANE-ELECTRODE ASSEMBLY

CROSS REFERENCE TO RELATED APPLICATION

The present application claims priority to Korean Patent Application No. 10-2021-0082026, filed Jun. 24, 2021, the entire contents of which is incorporated herein for all purposes by this reference.

TECHNICAL FIELD

The present invention relates to a method of producing an antioxidant that has improved antioxidant properties and is well dispersed when applied to a membrane-electrode assembly (MEA).

BACKGROUND

A proton exchange membrane fuel cell or polymer electrolyte membrane fuel cell (PEMFC) is a hydrogen fuel-based generator having the advantages of high energy efficiency, a simple system configuration, and eco-friendliness. Proton ion exchange membrane fuel cells have recently been spotlighted as energy conversion devices for eco-friendly vehicles.

The reaction for electricity generation of a fuel cell occurs in a membrane-electrode assembly (MEA) composed of a perfluorinated sulfonic acid (PFSA) ionomer-based electrolyte membrane, an anode, and a cathode). Hydrogen supplied to the anode (oxidation electrode) of a fuel cell is split into protons and electrons. The protons move to the cathode (reduction electrode) through the polymer electrolyte membrane, and the electrons move to the cathode through an external circuit. Oxygen molecules, protons, and electrons react on the cathode to produce electricity and heat as main products and produce water as a by-product.

Hydrogen and oxygen that are reaction gases for a fuel cell cross over through an electrolyte membrane to facilitate generation of hydrogen peroxide (HOOH). The hydrogen peroxide generates highly reactive oxygen-containing radicals such as hydroxyl radicals (OH) and hydroperoxyl radicals (OOH). These radicals attack an ionomer binder in the perfluorinated sulfonic acid-based electrolyte membrane and the electrodes, thereby causing chemical degradation of the membrane-electrode assembly and eventually reducing the durability of the fuel cell.

Methods of adding various kinds of antioxidants have been proposed as a technique to alleviate the chemical degradation. Antioxidants are categorized into primary antioxidants functioning as a radical scavenger or quencher and secondary antioxidants functioning as a hydrogen peroxide decomposer. Each antioxidant may be used alone or in combination with others.

Representative primary antioxidants include cerium-group antioxidants such as cerium oxide (or called ceria) and cerium (III) nitrate hexahydrate and manganese-group antioxidants. On the other hand, representative secondary antioxidants include manganese-group antioxidants such as manganese oxide and transition metal catalysts such as platinum (Pt).

It is known that the antioxidant effect of cerium-group materials used as primary antioxidants is due to cerium trivalent ions ($Ce^{3+}$). Therefore, in the case of cerium oxide, suggested is an approach to increase the antioxidant effect by increasing the ratio of cerium trivalent ions ($Ce^{3+}$) to cerium tetravalent ions ($Ce^{4+}$) by using the technology of introducing oxygen vacancies by reducing the surface of cerium oxide ($CeO2 \rightarrow CeO_{2-X}$).

However, in this case, since the chemical reactivity is increased due to the generated oxygen vacancies, a phenomenon of agglomeration occurs due to reaction with an element having a high electron density and sharing of an oxygen element among the same particles. Accordingly, to increase the degree of dispersion and/or distribution, a surfactant is introduced to stabilize the surface of the antioxidant. However, this has the disadvantage of reducing the active surface area of the antioxidant, thereby reducing the durability of the fuel cell. Therefore, it is necessary to develop a technology that can enhance the antioxidant ability or activity through a large active site and can secure distributional stability.

SUMMARY OF THE INVENTION

In preferred aspects, provided is a method of producing an antioxidant having improved antioxidant ability or activity and distributional stability in an electrolyte membrane.

However, the objectives of the present invention are not limited the one described above. The objectives of the present invention will become more apparent from the following description and will be realized with components recited in the claims and combinations of the components.

In an aspect, provided is a method of producing an antioxidant for a membrane-electrode assembly. The method may include: preparing a power including reduced metal oxide; and mixing the powder with an ionomer to obtain an antioxidant in which the ionomer is bound to the surface of the reduced metal oxide.

The term "metal oxide" as used herein refers to a compound including a metal component (e.g., alkali metals, alkali earth metals, or transition metals) combined with one or more oxygen atoms. The metal oxide may be formed by stable chemical bonds between the metal and the oxygen atoms. Exemplary metals in preferred embodiments may include cerium (Ce), samarium (Sm), gadolinium (Gd), zirconium (Zr), and titanium (Ti).

The reduced metal oxide refers to the metal oxide compound that is reduced by chemical reagents, by heating, or by electrolysis. In certain preferred embodiments, the metal oxide may be reduced by heating or heat-treating in a presence of a reducing agent (e.g., thiourea dioxide).

The term "ionomer" as used herein refers to a polymeric material or resin that includes ionized groups attached (e.g. covalently bonded) to the backbone of the polymer as pendant groups. Preferably, such ionized groups may be functionalized to have ionic characteristics, e.g., cationic or anionic.

The ionomer may suitably include one or more polymers selected from the group consisting of a fluoro-based polymer, a perfluorosulfone-based polymer, a benzimidazole-based polymer, a polyimide-based polymer, a polyetherimide-based polymer, a polyphenylene sulfide-based polymer, a polysulfone-based polymer, a polyethersulfone-based polymer, a polyetherketone-based polymer, a polyetheretherketone-based polymer, a polyphenylquinoxaline-based polymer and a polystyrene-based polymer.

The reduced metal oxide may be obtained by preparing an admixture containing a metal oxide and thiourea dioxide, pulverizing the admixture, and heat-treating the pulverized admixture.

The metal oxide may include one or more selected from the group consisting of cerium oxide, cerium zirconium oxide, gadolinium-doped cerium oxide, samarium-doped cerium oxide, titanium-doped cerium oxide cerium oxide supported on titanium oxide, and cerium oxide supported on silica.

The reduced metal oxide may have oxygen vacancies because metal cations in the metal oxide are reduced by a reaction between the metal oxide and the thiourea dioxide.

The admixture may be pulverized by mechanical milling at a speed of about 300 RPM to 500 RPM.

The pulverized admixture may be heat-treated in a temperature range of about 80° C. to 150° C.

The reduced metal oxide may have a crystal size of about 10 nm or greater.

In certain preferred aspect, the method may obtain an antioxidant by mixing the reduced metal oxide with the ionomer without adding a solvent.

The ionomer may include a perfluorinated polymer.

The production method may be a method of mixing 100 parts by weight of the reduced metal oxide with about 40 to 50 parts by weight of the ionomer.

The production method may further include dispersing the antioxidant in a solvent to obtain a solution.

The solvent may be an alcohol-based solvent, an aqueous solvent, or a combination thereof.

In an aspect, provided is a method for manufacturing an electrolyte membrane for a membrane-electrode assembly. The method may include the steps of: adding the antioxidant prepared by the method described above to an ionomer solution to obtain a mixed solution; and applying the mixed solution on a substrate to obtain an electrolyte membrane.

The ionomer solution may include the antioxidant in an amount of about 0.5 to 1 part by weight with respect to 100 parts by weight of the solids content in the ionomer solution.

The present invention provides antioxidants having improved antioxidant ability by inducing oxygen vacancies in the metal oxide through a reduction treatment to form a large active site.

The present invention provides antioxidants that may be uniformly dispersed in the electrolyte membrane by introducing a solid ionomer as a surface stabilizer (capping agent) to the surface of the reduced metal oxide.

According to various exemplary embodiments of the present invention, the chemical durability and service life of the electrolyte membrane and the membrane-electrode assembly including the same may be increased.

However, the advantages of the present invention are not limited thereto. It should be understood that the advantages of the present invention include all effects that can be inferred from the description given below.

Other aspects of the invention are disclosed infra.

BRIEF DESCRIPTION OF THE DRAWINGS

The above and other objectives, features, and other advantages of the present invention will be more clearly understood from the following detailed description taken in conjunction with the accompanying drawings, in which.

DETAILED DESCRIPTION

Figure 1:
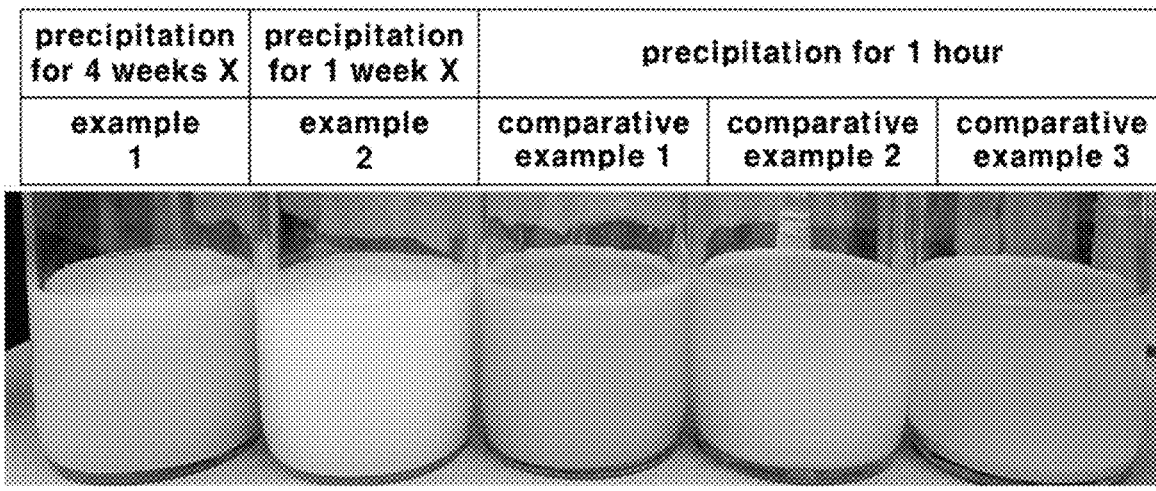
FIG. 1 shows results when the dispersions of antioxidants according to Examples 1 and 2 and Comparative Examples 1 to 3 were left for a certain period of time.

Reference now should be made to the drawings, in which the same reference numerals are used throughout the different drawings to designate the same or similar components.

Above objectives, other objectives, features, and advantages of the present invention will be readily understood from the following preferred embodiments associated with the accompanying drawings. However, the present invention is not limited to the embodiments described herein and may be embodied in other forms. The embodiments described herein are provided so that the disclosure can be made thorough and complete and that the spirit of the present invention can be fully conveyed to those skilled in the art.

Throughout the drawings, like elements are denoted by like reference numerals. In the accompanying drawings, the dimensions of the structures are larger than actual sizes for clarity of the present invention. Terms used in the specification, "first", "second", etc., may be used to describe various components, but the components are not to be construed as being limited to the terms. These terms are used only for the purpose of distinguishing a component from another component. For example, a first constitutive element may be referred as a second constitutive element, and the second constitutive element may be also referred to as the first constitutive element. As used herein, the singular forms "a", "an", and "the" are intended to include the plural forms as well unless the context clearly indicates otherwise.

It will be further understood that the terms "comprises", "includes", or "has" when used in this specification specify the presence of stated features, regions, integers, steps, operations, elements and/or components, but do not preclude the presence or addition of one or more other features, regions, integers, steps, operations, elements, components and/or combinations thereof. It will also be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and admixtures used herein are to be taken as approximations including various uncertainties affecting measurement that inherently occur in obtaining these values, among others, and thus should be understood to be modified by the term "about" in all cases.

Unless otherwise indicated, all numbers, values, and/or expressions referring to quantities of ingredients, reaction conditions, polymer compositions, and formulations used herein are to be understood as modified in all instances by the term "about" as such numbers are inherently approximations that are reflective of, among other things, the various uncertainties of measurement encountered in obtaining such values.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

In an aspect, provided is a method of producing an antioxidant for a membrane-electrode assembly, and the method includes: preparing a powder comprising reduced metal oxide; and mixing the powder with an ionomer in the form of powder to obtain an antioxidant in which the ionomer is bound to the surface of the reduced metal oxide.

The reduced metal oxide may be obtained by reducing the surface of the metal oxide having antioxidant ability. For example, the reduced cerium oxide ($CeO_{2-x}$) has oxygen vacancies. Therefore, the ratio of cerium tetravalent ions ($Ce^{4+}$) to cerium trivalent ions ($Ce^{3+}$) in the reduced cerium oxide ($CeO_{2-x}$) is higher than in a cerium oxide ($CeO_2$). Accordingly, the reduced cerium oxide ($CeO_{2-x}$) exhibits greater chemical reactivity than the cerium oxide ($CeO_2$) and can react more actively with highly reactive oxygen-containing radicals such as hydroxyl radicals and hydroperoxyl radicals.

However, when the reduced cerium oxide ($CeO_{2-x}$) comes into contact with an oxygen-containing solvent such as water or alcohol in the process of introducing the reduced cerium ($CeO_{2-x}$) into an electrolyte membrane, the reduced cerium oxide ($CeO_{2-x}$) reacts with oxygen atoms and aggregates. This significantly may reduce the degree of dispersion or distribution of the reduced cerium oxide. To solve this problem, in the present invention, a surface stabilizer (also called capping agent) may be applied to the reduced cerium oxide. This will be described later.

The reduced metal oxide can be obtained by preparing an admixture containing a metal oxide and thiourea dioxide, pulverizing the admixture, and heat-treating the pulverized admixture.

The metal oxide may suitably include one or more selected from the group consisting of cerium oxide, cerium zirconium oxide, gadolinium-doped cerium oxide, samarium-doped cerium oxide, titanium-doped cerium oxide cerium oxide supported on titanium oxide, cerium oxide supported on silica, and combinations thereof.

The reduced metal oxide may have oxygen vacancies that are generated as metal cations in the metal oxide are reduced by a reaction between the metal oxide and the thiourea dioxide.

The reaction between the metal oxide and the thiourea dioxide may be accomplished through pulverization and heat treatment.

First, an admixture containing the metal oxide and the thiourea dioxide may be pulverized by a jet mill, a bead mill, or an apex. Preferably, the admixture may be pulverized by a bead mill such as a ball mill. Particularly, the admixture may be pulverized through ball milling at a speed of about 300 to 500 RPM.

The pulverized admixture may be heat-treated in a temperature range of about 80° C. to 150° C. The unreacted thiourea remaining after the heat treatment may be removed. When the heat treatment is performed at a temperature less than about 80° C., since the temperature is lower than the melting point of thiourea, the unreacted thiourea cannot be removed. On the other when, the temperature is higher than 150° C., the pulverized admixture may be thermally decomposed.

The reduced metal oxide is confirmed to have a crystal size of about 10 nm or more by X-ray diffraction (XRD). When the crystal size of the reduced metal oxide is less than about 10 nm, the reduced metal oxide may not be suitable as an antioxidant because the reduced metal oxide shows excessively high dissolution properties. The upper limit of the crystal size is not particularly limited, but it may be, for example, about 50 nm or less, or about 30 nm or less, or about 20 nm or less.

Since the reduced metal oxide has high chemical reactivity due to the oxygen vacancies, when the reduced metal oxide is applied to an electrolyte membrane, the oxygen vacancies may be sacrificed by reacting with an oxygen-containing solvent or the reduced metal oxide aggregates, so that antioxidant ability may be reduced.

Accordingly, in an exemplary embodiment of the present invention, an ionomer may be bound to the surface of a reduced metal oxide as a surface stabilizer. The ionomer is added in a powder form so that the ionomer can be dry-mixed with the reduced metal oxide.

An antioxidant in which the ionomer is bound to the surface of the reduced metal oxide may be obtained by mixing the reduced metal oxide with the powdery ionomer without using a solvent. For example, the reduced metal oxide and the powdery ionomer may be dry-milled using a mixer or the like.

The ionomer may include a perfluorinated polymer. The ionomer may be the same as or different from an ionomer used in an electrolyte membrane of a membrane-electrode assembly to be described later.

It is appreciated that the perfluorinated polymer may be supplied by selecting one or more of Nafion (manufactured by DuPont), 3M Ionomer (manufactured by 3M), Fumion (manufactured by FuMA-Tech), Aciplex (manufactured by Asahi Kasei Corporation), Aquivion (manufactured by Solvay), perfluorosulfonic acid (PFSA), polytetrafluoro Loethylene, poly (vinylidene fluoride), and poly (vinyl fluoride).

The ionomer may be added in an amount of about 40 to 50 parts by weight with respect to 100 parts by weight of the reduced metal oxide. When the content of the ionomer is less than 40 parts by weight, the ionomer cannot sufficiently bind to the reduced metal oxide. In this case, when the antioxidant is mixed with a solvent, the degree of dispersion and/or distribution is low.

The antioxidant may be used in a powder form or may be used in a solution form obtained by dispersing powdery antioxidant in a solvent. Particularly, the solution may be obtained by dispersing the antioxidant in a solvent including an alcohol-based solvent, an aqueous solvent, or a combination thereof.

The alcohol-based solvent is not particularly limited, but examples thereof may include methanol, ethanol, n-propyl alcohol, isopropyl alcohol, butanol, and the like.

In an aspect, provided is a method of manufacturing an electrolyte membrane for a membrane-electrode assembly and the method includes the steps: obtaining a mixed solution by adding the antioxidant prepared by the method as described above to an ionomer solution and applying the mixed solution on a substrate to obtain an electrolyte membrane.

The ionomer solution may be a dispersion in which an ionomer is dispersed in a solvent. The ionomer may be a perfluorinated polymer and may be the same as or different from the ionomer included in the antioxidant.

The antioxidant may be added in an amount of about 0.5 to 1 part by weight with respect to 100 parts by weight of a solid content of the ionomer solution.

EXAMPLE

Hereinbelow, the present invention will be described in more detail with reference to examples and test examples. However, the examples and test examples are presented only for illustrative purposes and should not be interpreted to limit the scope of the present invention.

Preparation Example—Preparation of Reduced Metal Oxide

A metal oxide admixture containing cerium oxide ($CeO_2$) and thiourea dioxide was pulverized with a ball mill and heat-treated at a temperature of about 80° C. to obtain reduced cerium oxide.

Examples 1 and 2 and Comparison Examples 1 to 4

(Example 1) An antioxidant was obtained by dry-mixing 10 g of the reduced cerium oxide of Preparation Example with 5 g of perfluorosulfonic acid (PFSA) which is an ionomer. The antioxidant was dispersed in 85 g of a solvent in which n-propyl alcohol and water were mixed in a weight ratio of 6:4.

(Example 2) An antioxidant dispersion was prepared in the same manner as in Example 1, except that 4 g of perfluorosulfonic acid (PFSA) and 86 g of a solvent were used.

(Comparative Example 1) An antioxidant dispersion was prepared in the same manner as in Example 1, except that 3 g of perfluorosulfonic acid (PFSA) and 87 g of a solvent were used.

(Comparative Example 2) An antioxidant dispersion was prepared in the same manner as in Example 1, except that 2 g of perfluorosulfonic acid (PFSA) and 88 g of a solvent were used.

(Comparative Example 3) An antioxidant dispersion was prepared in the same manner as in Example 1, except that 1 g of perfluorosulfonic acid (PFSA) and 89 g of a solvent were used.

(Comparative Example 4) 10 g of the reduced cerium oxide of Preparation Example was added to an ionomer solution containing 5 g of perfluorosulfonic acid, 13.8 g of n-propyl alcohol, and 9.2 g of water and mixed by wet milling to obtain an antioxidant. The antioxidant was dispersed in 62 g of a solvent in which n-propyl alcohol and water were mixed in a weight ratio of 6:4.

FIG. 1 shows results when the dispersions of antioxidants according to Examples 1 and 2 and Comparative Examples 1 to 3 were left for a certain period of time.

In Example 1 in which 50 parts by weight of the ionomer was added and Example 2 in which 40 parts by weight of the ionomer was added, with respect to 100 parts by weight of the reduced cerium oxide, precipitation was not observed for 4 weeks and 1 week, respectively. For those periods, the antioxidant was evenly dispersed.

On the other hand, in the dispersions of Comparative Examples 1, 2 and 3 in which 30 parts by weight, 20 parts by weight and 10 parts by weight of the ionomer were added, respectively, precipitation occurred within 1 hour. In addition, it was confirmed that Comparative Example 4 had poor dispersibility because precipitation occurred within 1 hour.

Example 3 and Comparative Examples 5 to 7

(Example 3) The antioxidant according to Example 1 was added to an ionomer solution containing perfluorosulfonic acid (PFSA) that is an ionomer to obtain a mixed solution. Particularly, the antioxidant was added in an amount of 0.8 parts by weight with respect to 100 parts by weight of the solid content of the ionomer solution. The mixed solution was applied on a substrate, dried, and heat-treated to prepare an electrolyte membrane.

(Comparative Example 5) An electrolyte membrane was prepared in the same manner as in Example 3, except that no antioxidant was added.

(Comparative Example 6) An electrolyte membrane was prepared in the same manner as in Example 3, except that as an antioxidant, the reduced cerium oxide prepared according to Preparation Example was used as it was.

(Comparative Example 7) An electrolyte membrane was prepared in the same manner as in Example 3, except that as an antioxidant, cerium hexahydrate was used.

Figure 2:
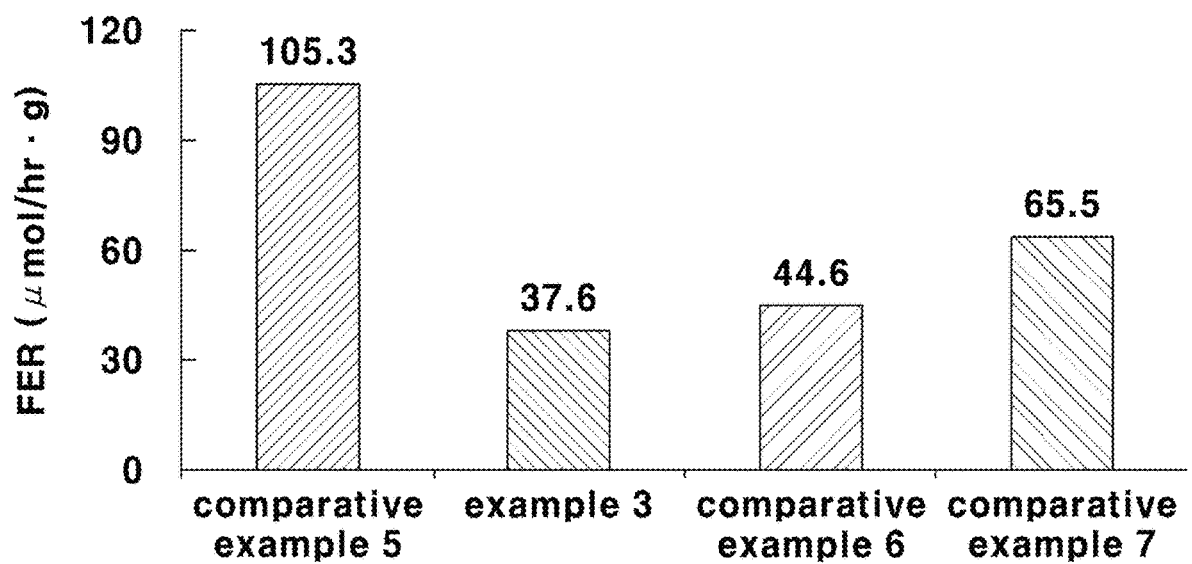
FIG. 2 shows changes in fluorine ion emissions, with time, from electrolyte membranes according to Example 3 and Comparative Examples 5 to 7.

FIG. 2 shows changes in fluorine ion emissions, with time, from electrolyte membranes according to Example 3 and Comparative Examples 5 to 7. It was confirmed from the results that Example 3 exhibited a significantly lower fluoride ion emission than Comparative Examples 5 to 7. This means that the chemical durability of Example 3 is very excellent.

Figure 3:
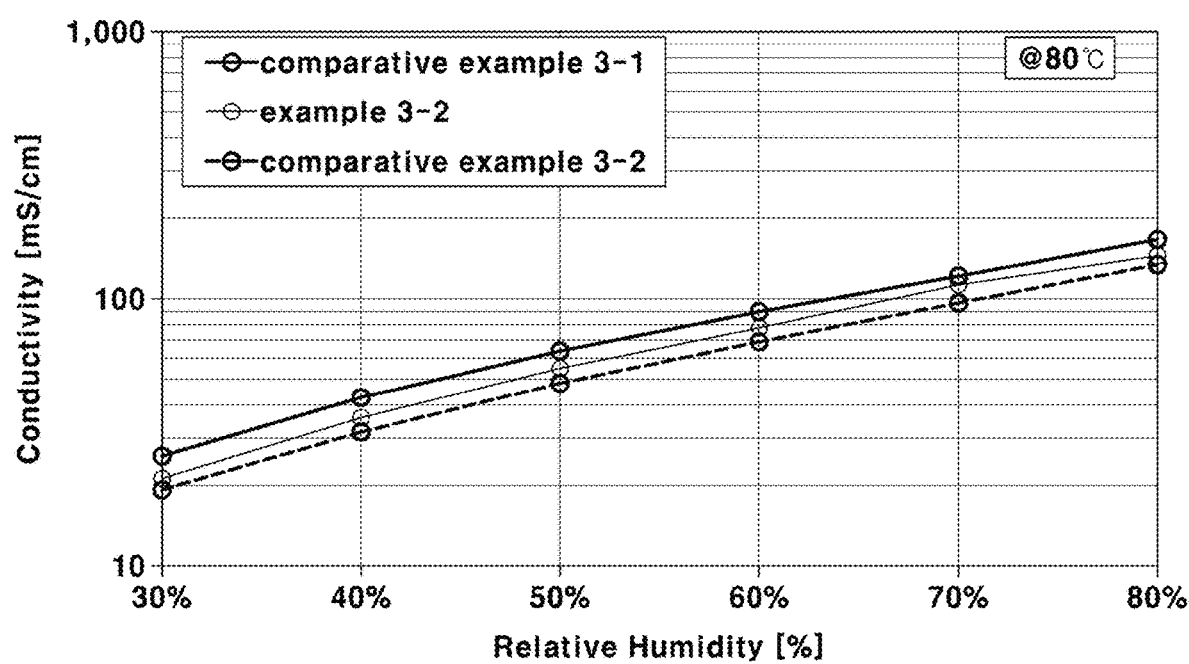
FIG. 3 shows measurement results of the proton conductivity of each of the electrolyte membranes according to Example 3 and Comparative Examples 5 to 6 while the relative humidity of each of the electrolyte membranes changes.

FIG. 3 shows measurement results of the proton conductivity of each of the electrolyte membranes according to Example 3 and Comparative Examples 5 to 6 while the relative humidity of each of the electrolyte membranes changes. As shown in FIG. 3, Example 3 had less proton conductivity than Comparative Example 5 that did not contain an antioxidant but had a greater proton conductivity by about 15% or greater than Comparative Example 6 in which reduced cerium oxide was used as an antioxidant with no surface stabilizer when the temperature is 80° C. and the relative humidity was 50%.

Although examples and experimental examples according to the present invention have been described for illustrative purposes, those skilled in the art will appreciate that various modifications, additions and substitutions are possible, without departing from the scope and spirit of the invention as defined by the appended claims,

What is claimed is:

1. A method of producing an antioxidant for a membrane-electrode assembly, comprising:
preparing a powder comprising reduced metal oxide; and mixing the powder with a powdery ionomer to obtain an antioxidant in which the ionomer is bound to a surface of the reduced metal oxide.

2. The method according to claim 1, wherein the reduced metal oxide is obtained by preparing an admixture comprising a metal oxide and thiourea dioxide, pulverizing the admixture, and heat-treating the pulverized admixture.

3. The method according to claim 2, wherein the metal oxide comprises one or more selected from the group consisting of cerium oxide, cerium zirconium oxide, gadolinium-doped cerium oxide, samarium-doped cerium oxide, titanium-doped cerium oxide cerium oxide supported on titanium oxide, and cerium oxide supported on silica.

4. The method according to claim 2, wherein the reduced metal oxide has oxygen vacancies generated by reduction of metal cations in the metal oxide due to a reaction between the metal oxide and the thiourea dioxide.

5. The method according to claim 2, wherein the admixture is pulverized by mechanical milling at a speed of about 300 to 500 RPM.

6. The method according to claim 2, wherein the pulverized admixture is heat-treated in a temperature range of about 80° C. to 150° C.

7. The method according to claim 1, wherein the reduced metal oxide has a crystal size of about 10 nm or greater.

8. The method according to claim 1, wherein the reduced metal oxide is mixed with the ionomer without using a solvent to obtain the antioxidant.

9. The method according to claim 1, wherein the ionomer comprises a perfluorinated polymer.

10. The method according to claim 1, wherein the ionomer is mixed in an amount of about 40 to 50 parts by weight with respect to 100 parts by weight of the reduced metal oxide.

11. The method according to claim 1, further comprising dispersing the antioxidant in a solvent to obtain a solution.

12. The method according to claim 11, wherein the solvent comprises an alcohol-based solvent, an aqueous solvent, or a combination thereof.

13. A method of manufacturing an electrolyte membrane for a membrane-electrode assembly, the method comprising:
adding the antioxidant produced by a method of claim 1 to an ionomer solution to obtain a mixed solution; and
applying the mixed solution on a substrate to obtain an electrolyte membrane.

14. The method according to claim 13, wherein the ionomer solution comprises the antioxidant in an amount of about 0.5 to 1 part by weight with respect to 100 parts by weight of the solid content of the ionomer solution.

* * * * *